2,965,581

DEFOAMING PROCESS

Robert C. Hyatt, Cranford, N.J., and Anthony J. Martinelli, Easton, Pa., assignors to General Aniline & Film Corporation, New York, N.Y., a corporation of Delaware No Drawing. Original application Dec. 30, 1954, Ser. No. 478,873, now Patent No. 2,920,047, dated Jan. 5, 1960. Divided and this application Feb. 5, 1958, Ser. No. 713,309

6 Claims. (Cl. 252—321)

This invention relates to the provision of a new process for inhibiting foaming of liquid systems.

Various liquid systems of an aqueous or non-aqueous type are found in industry which are subject to undesirable foaming during manufacture and/or use. Such liquid systems may be of the solution or dispersion type, the term "dispersion" being here employed generically to include emulsions of one liquid in another, suspensions of a solid in a liquid, and the like. By way of example, undesirable foaming may be encountered in the production and/or use of natural or synthetic rubber latices, rubber latex base paints, plastic latices, dyestuff preparations, pharmaceutical preparations such as penicillin which is made by aerobic fermentation, paper pulp in aqueous slurries, glue solutions, drilling muds, materials used in textile finishing operations such as in the application of insoluble finishing compositions, e.g. waterproofing emulsions, and the like.

It is an object of this invention to provide a novel process for inhibiting the foaming of liquid systems. Other objects and advantages will appear as the description proceeds.

It has now been found that the aforementioned foaming problems may be solved by treatment of the liquid system which is subject to foaming with an agent which may be represented by the general formlula

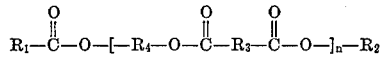

wherein $R_1$ is a radical of from 1 to 18 carbon atoms; $R_3$ is a radical of from 1 to 8 carbon atoms; $R_4$ is selected from the group consisting of divalent alkyl radicals derived from alkanediols of from 2 to 6 carbon atoms at least 50 mole percent of which are $\alpha,\omega$-alkanediols; $R_2$ is selected from the group consisting of —H, —$R_4$—OH and

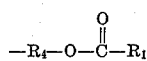

and $n$ has a value of about 2 to 15. These agents may be described as at least partially acylated polyesters of dicarboxylic acids and alkanediols.

Such agents may be prepared by reaction between a dicarboxylic acid of the formula HOOC—$R_3$—COOH, an alkanediol of the formula HO—$R_4$—OH, and a monocarboxylic acid of the formula $R_1$—COOH, wherein $R_1$, $R_3$ and $R_4$ have the values given above. The value of $n$ will depend upon the molecular proportions of reactants employed, the reaction conditions, and the stage at which the monocarboxylic acid $R_1$—COOH is added to the reaction medium. It will be understood, that regardless of the proportions of reactants employed, the polymeric product will not consist of a single material, compound or ester, but of a mixture of polymers of varying chain length and end group composition, combined with small amounts of unreacted monomers and simple esters. In most cases, it is preferred to react the dicarboxylic acid with at least an equimolar amount of the alkanediol in the production of the polyester. In general, proportions of about 1 to 2 moles of alkanediol for each mole of dicarboxylic acid may be employed, whereby the resulting polymer mixture will contain as its greatest component polyester chains having hydroxy groups at both ends. However, as mentioned above, it will be apparent that polyester chains will be present having terminal carboxy groups and/or both a hydroxy and a carboxy terminal group. The greater the proportion of alkanediol, the greater the proportion of polyester chains in the product containing two terminal hydroxy groups.

The monocarboxylic acid $R_1$—COOH which is employed for partial acylation of the hydroxy containing polyester chains may be added to the reaction medium at the beginning of the reaction, during the reaction or after the alkanediol and dicarboxylic acid have been reacted. When added before or during the polyester formation, the presence of the monocarboxylic acid in the reaction medium will obviously tend to shorten the length of the polyester chains by blocking further reaction of terminal hydroxy groups with carboxy groups of the dicarboxylic acid.

The reaction for producing the agents operative in the instant invention may be carried out in a manner conventional for esterification procedures at temperatures ranging from about 100° to 275° C., preferably 130 to 220° C., for a sufficient period of time to complete the reaction. Durations are generally of from about 2 to 12 or 14 hours depending upon whether the monocarboxylic acid is initially present in the polyesterification medium or is subsequently reacted with the polyester products, the nature and concentration of the reactants, reaction conditions and the like. The use of an inert atmosphere such as nitrogen assists in producing an acceptable product while at the same time aiding in removal of the water of condensation. Carbon dioxide which at the same time acts as a catalyst for the reaction may also be employed. An esterification catalyst is not necessary, but may be employed if desired. Suitable esterification catalysts include p-toluene sulfonic acid, sulfuric acid, $\beta$-camphor sulfonic acid, sodium hydroxide, or the like. If desired, activated carbon such as Nuchar may be employed during any desired stage of the reaction to improve the quality of the product. The use of a vacuum in conjunction with nitrogen and/or $CO_2$ as an inert atmosphere is likewise beneficial. In this manner all volatile materials, including water vapor and/or excess alkanediol or the like may be removed by distillation, preferably at a temperature ranging from about 150 to 300° C. and a pressure of 10 mm. of mercury or less for periods of 1 to 4 hours.

Similar considerations apply to the acylation reaction when the monocarboxylic acid is subsequently added. Temperatures of about 100 to 300° C. may be employed in conjunction with concurrent and/or subsequent vacuum treatment, if desired under nitrogen, to remove excess components including excess acid by distillation.

Alkanediols which may be employed for reaction with the dicarboxylic acid include 1,4-butanediol, 2,5-pentanediol, 1,4-hexanediol, and 2,5-hexanediol. Other operative alkanediols which may be employed in admixture with the aforementioned alkanediols include ethylene glycol, 1,2-propylene glycol, 1,3-propylene glycol, 1,2-butanediol, 2-methyl-2,3-butanediol, 2,4-pentanediol, 2-methyl-1,3-pentanediol, 3-ethyl-1,3-hexanediol, 2,4-hexanediol, 1,6-hexanediol and the like. In all cases, at least 50 mole percent of the alkanediols employed should be $\alpha,\omega$-alkanediols in order to produce the improved agents operative in the instant invention.

Suitable dicarboxylic acids which may be employed for reaction with the alkanediols mentioned above include malonic, succinic, glutaric, adipic, pimelic, azelaic, sebacic, oxydibutyric, diglycollic, phthalic, terephthalic, isophthalic, tetrahydrophthalic acids, and/or mixtures thereof or the like.

It will be understood from the above that whenever mixtures of alkanediols and/or dicarboxylic acids are reacted together, the polymeric products will contain polyester chains containing varying amounts of the reactants. In other words, in the formula given above, the recurring units in the compound as indicated by the portion in brackets may contain different values for $R_3$ and $R_4$ depending upon the reactants employed. However, it has been found that polyesters prepared from adipic acid as the dicarboxylic acid and a mixture of about equimolar amounts of 1,4-butanediol and 1,2-propylene glycol are generally superior in producing the desired results. In the preferred embodiment the polyester is formed from about 3 moles of adipic acid, 2 moles of 1,4-butanediol and 2 moles of 1,2-propylene glycol.

Monocarboxylic acids of from 2 to 19 carbon atoms which may be employed for acylating the hydroxy-chain ended polyesters include acetic, acetic anhydride, acrylic, vinyl acetic, propionic, cyclopropane carboxylic acid, butyric, 2-ethyl-1-hexanoic, allylacetic, valeric, tiglic, caproic, enanthic, caprylic, pelargonic, angelic, capric, hendecanoic, oleic, ricinoleic, lauric, erucic, palmitic margaric stearolic, stearic, benzoic, mono - 2 - ethylhexyl-phthalate acids or the like. Aliphatic acids of at least 9 carbon atoms are preferred. It will be understood that here also, mixtures of any of these acids may be employed, the resulting products being mixtures of the corresponding acylated polyesters. The proportion of acylated polyester chains having a terminal hydroxy group will of course be decreased as the molar ratio of acylating monocarboxylic acid to polyester chain is increased.

It will be understood that in preparing the agents of this invention, the functional equivalents of the acids may be employed, as for example their anhydrides, halides, salts or the like. Similarly, functional equivalents of the final agents, such as their salts or the like, may be used in place of the agents per se.

The instant invention may be put into practice by simply mixing a relatively small proportion of an agent of the type described above into a relatively large proportion of the liquid system tending to foam. The agent may be added directly or it may be first dissolved in or diluted with any suitable liquid medium to produce a concentrate or the like. As suitable solvents and diluents there may be mentioned water, petroleum hydrocarbons, benzene, toluene, xylene, aliphatic alcohols such as methyl alcohol, ethyl alcohol, denatured alcohol, propyl alcohol, isopropyl alcohol, butyl alcohol, octyl alcohol, mixtures thereof, and the like. Said agent may be employed as the sole defoaming agent or it may be employed in admixture with other suitable well known types of defoaming agents.

The proportions of defoaming agent to be added are ordinarily dependent upon the constitution of the liquid, the foaming of which must be inhibited. Concentrations of the order of from about 50 to 100,000 p.p.m., by volume, are generally employed, although concentrations outside this range may in some cases be effective. The optimum proportion of agent required for inhibiting the foam formation in any particular liquid system may readily be determined by routine experimentation.

The examples in the following tables are illustrative of the instant invention and are not to be regarded as limitative.

Table I below illustrates agents of the type above described which were tested under moderate agitation and found operative to a greater or lesser degree for inhibiting foaming. In this test, a 25 gram sample of the latex is weighed into a 100 ml. graduate and the volume was recorded in milliliters. The agent tested was then added to the system at a concentration of 1% based on total latex solids. The system was moderately agitated by shaking the graduate 25 times. After resting 30 seconds, the amount of foam in the graduate was recorded in mls.

*Table I*

DEFOAMING TESTS WITH MODERATE AGITATION

| Ex. | Composition | Milliliters of Foam | | |
|---|---|---|---|---|
| | | Dow 512-O | Dow 744-B | Rhoplex WC-9 |
| A | (Latex without additive—for comparison) | 90 | 100 | 100 |
| 1 | 2.0 moles 1,4-butanediol, 2.0 moles 1,2-propylene glycol, 3.0 moles adipic acid, 0.75 moles Neo-Fat 11 stripped, 250°/5mm. | 50 | 75 | 70 |
| 2 | 2.0 moles 1,4-butanediol, 2.0 moles 1,2-propylene glycol, 3.0 moles adipic acid, 0.75 moles Neo-Fat 11 stripped, 270°/5mm. | 60 | 75 | 70 |
| 3 | 5.33 moles 1,4-butanediol, 1.6 moles adipic acid, 0.4 moles phthalic acid, 1.29 moles Neo-Fat D-142, 1.33 moles acetic anhydride. | 65 | 90 | 75 |
| 4 | 1.34 moles 1,4-butanediol, 1.34 moles 1,2-propylene glycol, 0.8 moles adipic acid, 0.2 moles phthalic acid, 0.67 moles Neo-Fat 9 or 15, 0.67 moles 2-ethyl-1-hexanoic acid. | 65 | 90 | 70 |
| 5 | 2.0 moles 1,4-butanediol, 2.0 moles ethylene glycol, 1.6 moles adipic acid, 0.4 moles phthalic acid, 1.06 moles Neo-Fat 11, 0.27 moles oleic acid, 0.33 moles 2-ethyl-1-hexanoic acid. | 70 | 75 | 70 |
| 6 | 2.67 moles 1,4-butanediol, 2.67 moles 1,2-propylene glycol, 4.0 moles adipic acid, 1.0 moles 2-ethyl-1-hexonoic acid. | 75 | 100 | 75 |
| 7 | 1.5 moles 1,4-butanediol, 1.5 moles 1,2-propylene glycol, 0.75 moles adipic acid, 0.75 moles phthalic acid, 1.0 moles DD coco fatty acids, 0.167 moles 2-ethyl-1-hexanoic acids. | 65 | 85 | 70 |
| 8 | 0.65 moles 1,4-butanediol, 0.60 moles 1,2-propylene glycol, 1.0 moles adipic acid, 0.1 moles Neo-Fat 11, 0 44 moles 1,4-butanediol. | 80 | 95 | 65 |

When tested in a manner similar to that employed in the examples of Table I above, an agent prepared from the following reactants was found to be an effective defoaming agent for Dow 512–O latex;

2.67 moles 1,4-butanediol
2.67 moles 1,2-propylene glycol
1.0 mole adipic acid
1.0 mole phthalic acid
1.06 moles Neo-Fat 11
0.27 mole oleic acid
0.67 mole acetic anhydride When similarly tested, the agents prepared from the following reactants were found to be effective defoamers for Rhoplex WC–9.

EXAMPLE 10

1.34 moles 1,4-butanediol
1.34 moles 1,2-propylene glycol
0.80 mole adipic acid
0.2 mole phthalic acid
0.67 mole Neo-Fat 15 or 9
0.67 mole acetic anhydride

EXAMPLE 11

0.55 mole 1,6-hexanediol
0.25 mole adipic acid
0.25 mole phthalic acid

Table II below illustrates agents tested under rigorous agitation and found to be operative to a greater or lesser degree for inhibiting foaming in the stated latices. In this test, a 50 gram sample of the material, the foaming of which is to be inhibited containing 0.25 percent of the agent to be tested (based on the solids content of the material) was agitated in a 600 ml. beaker at high speed by means of a Hamilton Beach #33 mixer. The time required for the foam to reach the top of the beaker was recorded in each instance, being a measure of the agent's defoaming capacity.

Table II

DEFOAMING TESTS WITH RIGOROUS AGITATION

| Example | Chemical Composition | Time for Foam to Reach Top of Beaker (Min.) |
|---|---|---|
| DOW 512-O LATEX | | |
| AA | Latex without additive for comparison | 3.9 |
| 12 | 2.0 moles 1,4-butanediol, 2.0 moles 1,2-propylene glycol, 3.0 moles adipic acid, 0.75 moles Neo-Fat 11. | 12.6 |
| DOW 744-B LATEX | | |
| AAA | Latex without additive for comparison | 3.9 |
| 13 | 2.0 moles 1,4-butanediol, 2.0 moles 1,2-propylene glycol, 3.0 moles adipic acid, 0.75 moles 2-ethyl-1-hexanoic acid plus methyl alcohol. | 8.6 |
| 14 | 1.5 moles 1,4-butanediol, 1.5 moles 1,2-propylene glycol, 0.75 moles adipic acid, 0.75 moles phthalic acid, 1.0 moles DD coco fatty acids, 0.167 moles 2-ethyl-1-hexanoic acids. | 25.3 |

EXAMPLE 15

Adipic acid, 1,4-butanediol and 1,2-propylene glycol in molar proportions of, respectively, 3:2:2 were charged into a 4-necked flask equipped with thermometer, nitrogen inlet, sealed stirrer, and short Vigreaux distilling head connected to a condenser. After purging with nitrogen, the reaction mixture was heated at 150° to 212° C. for 6 hours while removing water by distillation as it was formed. The product was transferred to a still pot equipped with capillary inlet for dry, oxygen-free nitrogen, and heated in vacuo at 200° to 250° C. and 5 mm. of mercury for ¾ hour to remove excess propylene glycol and butanediol. After cooling, 0.75 mole of Neo-Fat 11 were added and the mixture heated at 140° to 210° C. for 4¼ hours and then at 200° to 250° C. and 5 mm. of mercury for 1 hour. A pale yellow viscous liquid was obtained having a molecular weight of about 1400.

Dow 512-O is a latex containing 45% by weight of styrenebutadiene copolymer. Dow 744-B is a latex containing 50% by weight of vinyl chloride-vinylidene chloride copolymer. Rhoplex WC-9 is a latex of Rohm & Haas containing 40% by weight of acrylic ester polymer. Compositions of certain monocarboxylic acid acylating agents are listed in the following Table III from information obtained from Armour and Company.

Table III

| Old Name | DD Coco Fatty Acids | Neo-Fat 9 or 15 | Neo-Fat 11 | Fractionated Tall Oil Neo-Fat D-142 |
|---|---|---|---|---|
| New Name | Neo-Fat 265 | Neo-Fat 10 | Neo-Fat 12 | Neo-Fat 42-06 |
| Caprylic Acid percent | | 8 | 3 | |
| Capric Acid do | | 7 | 92 | 1 |
| Lauric Acid do | | 49 | 5 | 95 |
| Myristic Acid do | | 17 | | 4 |
| Palmitic Acid do | | 9 | | |
| Stearic Acid do | | 2 | | |
| Oleic Acid do | | 6 | | | 50 |
| Linoleic Acid do | | 2 | | | 40 |
| Linolenic Acid do | | | | | 4 |
| Rosin Acids do | | | | | 6 |
| Titre °C | 22-26 | 28-33 | 41-43 | 17 |
| Iodine Value | 14 | 1.2 | 1.0 | 125 |
| Acid Value max | 272 | 329 | 282 | 198 |

This application is a division of our application Serial No. 478,873, filed December 30, 1954, now Patent No. 2,920,047, dated Jan. 5, 1960.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process for inhibiting foaming in a liquid system having a tendency to foam under agitation comprising subjecting said liquid system to the action of an agent characterized by the general formula

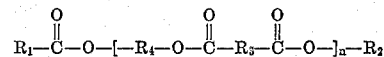

wherein $R_1$ is a hydrocarbon radical of from 1 to 18 carbon atoms; $R_3$ is a radical of from 1 to 8 carbon atoms; $R_4$ is selected from the group consisting of divalent alkyl radicals derived from alkanediols of from 2 to 6 carbon atoms at least 50 mole percent of which are $\alpha,\omega$-alkanediols; $R_2$ is selected from the group consisting of

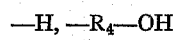

and

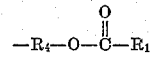

and $n$ has a value of about 2 to 15.

2. A process as defined in claim 1 wherein $R_1$ is derived from lauric acid, $R_3$ is derived from adipic acid, and $R_4$ is derived from a mixture of 1,4-butanediol and 1,2-propylene glycol.

3. A process as defined in claim 1 wherein said agent is derived from about 2.0 moles of 1,4-butanediol, 2.0 moles of 1,2-propylene glycol, 3.0 moles of adipic acid and 0.7 mole of lauric acid.

4. A process as defined in claim 1 wherein said liquid system is an aqueous dispersion of a styrene-butadiene copolymer.

5. A process as defined in claim 1 wherein said liquid system is an aqueous dispersion of a vinylchloride-vinylidene chloride copolymer.

6. A process as defined in claim 1 wherein said liquid system is an aqueous dispersion of an acrylic polymer.

References Cited in the file of this patent

UNITED STATES PATENTS

| 2,668,150 | Luvisi | Feb. 2, 1954 |
| 2,715,614 | Snook | Aug. 16, 1955 |
| 2,727,009 | Jursich | Dec. 13, 1955 |
| 2,748,086 | Monson | May 29, 1956 |
| 2,843,551 | Leonard et al. | July 15, 1958 |
| 2,846,404 | Johnson | Aug. 5, 1958 |
| 2,849,405 | Schott et al. | Aug. 26, 1958 |